(12) United States Patent
Abiri et al.

(10) Patent No.: US 11,757,308 B2
(45) Date of Patent: Sep. 12, 2023

(54) LASER WIRELESS POWER TRANSFER SYSTEM WITH ACTIVE AND PASSIVE SAFETY MEASURES

(71) Applicant: California Institute of Technology, Pasadena, CA (US)

(72) Inventors: Behrooz Abiri, Pasadena, CA (US); Aroutin Khachaturian, Pasadena, CA (US); Seyed Ali Hajimiri, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 16/776,482

(22) Filed: Jan. 29, 2020

(65) Prior Publication Data

US 2020/0227949 A1    Jul. 16, 2020

Related U.S. Application Data

(63) Continuation of application No. 15/604,587, filed on May 24, 2017, now Pat. No. 10,587,152.

(Continued)

(51) Int. Cl.
*H02J 50/30* (2016.01)
*H02J 50/80* (2016.01)
*H02J 50/90* (2016.01)

(52) U.S. Cl.
CPC ............ *H02J 50/30* (2016.02); *H02J 50/80* (2016.02); *H02J 50/90* (2016.02)

(58) Field of Classification Search
CPC .. H02J 50/80; H02J 50/50; H02J 50/30; H02J 50/90
See application file for complete search history.

(56) References Cited

U.S. PATENT DOCUMENTS

| 7,423,767 B2 | 9/2008 | Steinsiek et al. |
| 7,532,657 B2 | 5/2009 | Ishizu |

(Continued)

FOREIGN PATENT DOCUMENTS

WO    WO 2017/205549 A2    11/2017

OTHER PUBLICATIONS

U.S. Appl. No. 15/604,587, Non-Final Office Action dated Apr. 3, 2019.

(Continued)

*Primary Examiner* — Jared Fureman
*Assistant Examiner* — Duc M Pham
(74) *Attorney, Agent, or Firm* — Weaver Austin Villeneuve & Sampson LLP

(57) ABSTRACT

A wireless laser power transfer system includes, in part, a transmitter and a receiver that form a wireless link. The transmitter, includes, in part, a first communication system, at least a first source of laser beam, and a controller adapted to vary power and direction of the laser beam and further to modulate the laser beam. The receiver includes, in part, a communication system adapted to establish a wireless link with the first communication system, at least a first photo-voltaic cell, and a controller adapted to demodulate and detect the power of the modulated laser beam received by the first photo-voltaic cell from the first source of laser beam. The system optionally includes at least a second source of laser beam controlled by the transmitter controller. The system optionally further includes a second photo-voltaic cell. The transmitter controller is further adapted to cause the second laser beam to strike the second photo-voltaic cell.

24 Claims, 7 Drawing Sheets

Related U.S. Application Data

(60) Provisional application No. 62/340,951, filed on May 24, 2016.

(56) References Cited

U.S. PATENT DOCUMENTS

| | | | |
|---|---|---|---|
| 10,587,152 B2* | 3/2020 | Abiri | H02J 50/80 |
| 2013/0293417 A1* | 11/2013 | Tong | H01Q 21/28 |
| | | | 342/359 |
| 2014/0092929 A1* | 4/2014 | Alpert | H01S 3/083 |
| | | | 372/38.04 |
| 2015/0186701 A1 | 7/2015 | Otis et al. | |

OTHER PUBLICATIONS

U.S. Appl. No. 15/604,587, Notice of Allowance dated Feb. 19, 2020.
WIPO Application No. PCT/US2017/034342, PCT International Preliminary Report on Patentability dated Dec. 6, 2018.
WIPO Application No. PCT/US2017/034342, PCT International Search Report and Written Opinion of the International Searching Authority dated Jan. 5, 2018.

\* cited by examiner

LASER WIRELESS POWER TRANSFER SYSTEM WITH ACTIVE AND PASSIVE SAFETY MEASURES

CROSS-REFERENCES TO RELATED APPLICATION

This application is a continuation application of U.S. patent application Ser. No. 15/604,587, filed May 24, 2017, which claims the benefit of U.S. Provisional Application No. 62/340,951, filed May 24, 2016, the contents of which are incorporated herein by reference in their entirety

FIELD OF THE INVENTION

The present invention relates to wireless power transfer, particularly using lasers.

BACKGROUND OF THE INVENTION

Wireless power delivery has been an active field of research. NASA has been working on systems to use high intensity lasers to power small UAVs or Vehicles. Due to laser safety regulations, however, such systems have a limited power delivery capability. While high intensity laser are used in the industry, their use is restricted in closed environments where people are not present. Laser radiation injury is mainly caused by thermal damage to the living tissue.

While laser skin burns only happen under extremely powerful laser beams, human retina is quite sensitive and can damage under much lower intensities. The IEC60825 is an international standard that specifies the limits and classes of lasers. Based on the IEC60825 standard, the maximum permissible exposure (MPE) at the human cornea depends on both the laser energy and duration of exposure. FIG. 1 shows a plot of MPE for different wavelengths at different exposure times, and assuming that the power is concentrated directly at the cornea.

BRIEF SUMMARY OF THE INVENTION

A wireless laser power transfer system, in accordance with one embodiment of the present invention includes, in part, a transmitter and a receiver that form a wireless link. The transmitter, includes, in part, a first transceiver, at least a first source of laser beam, and a first controller adapted to vary a power and a direction of the laser beam and further to modulate the laser beam. The receiver includes, in part, a second transceiver adapted to establish a wireless link with the first transceiver, at least a first photo-voltaic cell, and a second controller adapted to demodulate and detect the power of the modulated laser beam received by the first photo-voltaic cell from the first source of laser beam.

In one embodiment, the transmitter further includes, in part, at least a second source of laser beam. The first controller is further adapted to vary a power and a direction of the second laser beam, and further to modulate the second laser beam. In one embodiment, the first controller modulates the first and second laser beams using the same modulation technique. In one embodiment, the receiver further includes, in part, a second photo-voltaic cell. The controller is further adapted to cause the second laser beam to strike the second photo-voltaic cell.

In one embodiment, the first controller is further adapted to cause the first laser source to operate at a first power level if the power of the laser beam received at the receiver matches an expected power level. In one embodiment, the first controller is further adapted to cause the first laser source to operate at a second power level if the power of the laser beam received at the receiver does not match the expected power level, said second power-level being either zero or an eye-safe power level.

In one embodiment, the first controller causes the first laser source to operate at the first or second power level in response to data the first controller receives from the second controller. The data is exchanged between the first and second transceivers. In one embodiment, the first laser source is disposed on a first panel and the second laser source is disposed on a second panel. The first and second panels are positioned at different orientations with respect to the first photo-volatile cell. In one embodiment, the laser has a bandwidth ranging from 250 nm to 450 nm.

A method of transferring laser power wirelessly, in accordance with one embodiment of the present invention includes, in part, setting the power of at least a first laser beam to a first value, modulating the first laser beam, delivering the first laser beam to at least a first photo-voltaic cell, demodulating the delivered laser beam, detecting the power of the delivered laser beam, and varying the power of the first laser beam to a second value greater than the first value if the detected power value matches an expected power.

The method, in accordance with one embodiment of the present invention further includes, in part, generating at least a second laser beam, modulating the second laser beam, and varying the power and the direction of the second laser beam. In one embodiment, the first and second laser beams are modulated using the same modulation technique. In one embodiment, the method further includes, in part, disposing a second photo-voltaic cell adjacent first photo-voltaic cell. In one embodiment, the method further includes, in part, causing the second laser beam to strike the second photo-voltaic cell.

In one embodiment, the method further includes, in part, changing the power of the first laser beam from the second value to the first value if the detected power value does not match the expected power value. In one embodiment, the method further includes, in part, changing the power of the first laser beam from the first value to the second value following the change from the second value to the first value if the power value is detected to match the expected power value following an expiration of a first time period.

In one embodiment, the method further includes, in part, causing the power of the first laser beam to change from the first value to the second value, and from the second value to the first value in response to data exchanged wirelessly between a first controller controlling the first laser beam and a second controller responsive to the first photo-voltaic cell. In one embodiment, the first laser source is disposed on a first panel and the second laser source is disposed on a second panel. The first and second panels are positioned at orientations with respect to the first photo-volatile cell. In one embodiment, the laser beam has a bandwidth ranging from 250 nm to 450 nm.

DETAILED DESCRIPTION OF THE INVENTION

In accordance with embodiments of the present invention, one or more high power laser beams are transferred wirelessly to power a device while satisfying the MPE safety standards. Embodiments of the present invention include active and passive protective techniques to provide a scalable solution for a selected level of wireless power delivery without surpassing the MPE safety levels. The active protection/safety systems ensure that the exposure time never exceeds a predefined value (10 us for example). The passive protection/safety systems reduce the beam power intensity (power per unit area) by increasing the effective beam width.

Figure 2:
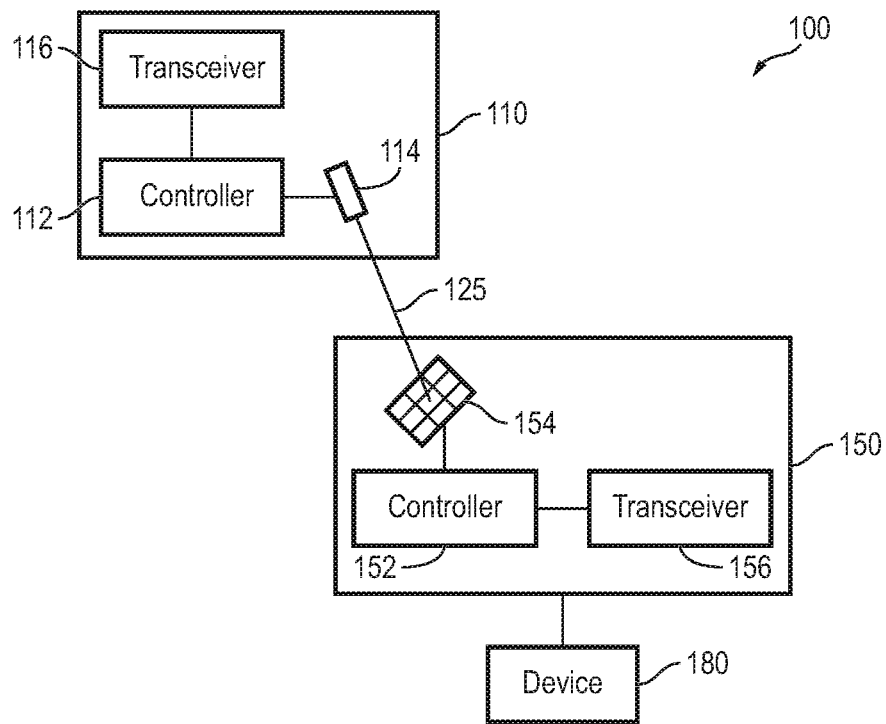
FIG. 2 is a simplified high-level block diagram of a wireless laser power transfer system, in accordance with one exemplary embodiment of the present invention

FIG. 2 is a simplified high-level block diagram of a wireless laser power transfer system 100 with active safety protection, in accordance with one exemplary embodiment of the present invention. System 100 is shown as including, in part a laser beam transmitter (alternatively referred to herein as transmitter) 110, and a laser beam receiver (alternatively referred to herein as receiver) 150. Transmitter 110 includes at least one laser beam generator and scanner (collectively referred to herein as laser scanner or scanner) 114, a controller 112 and a wireless communication system 116. The scanner may be a galvo scanner, MEMS micromirror scanner, accousto optic scanner, an optical phased array, or the like. Receiver 150 includes one or more photo-voltaic (PV) cells 154, a controller 152, and a wireless communication system 156. Each of communication systems 116, 156 may be a transmitting unit, a receiving unit or a transceiver. The following description of the embodiments of the present invention are provided with reference to the communication systems being transceivers. However, it is understood that the above embodiments of the present invention are not so limited and other communication systems such as transmitting units or receiving units may also be used. Transmitter 110 and receiver 150 are adapted to communicate with one another using a wireless link (e.g., infrared or RF) established between their respective transceivers. It is understood that the drawings do not show antennas that may be used in some embodiments, such as those that use RF signals for wireless transfer of information.

Controller 112 is adapted to control laser beam scanner 114 to direct laser beam emitted from the laser source to PV 154. Controller 112 is further adapted to control and vary the power of the laser beam generated by scanner 114. Accordingly the laser beam may have an output level that is eye-safe for any duration of exposure, as well as a multitude of higher power levels for delivery to receiver 150. In one embodiment (not shown), the laser beam generated by scanner 114 may include a fiber optic assembly having disposed therein a central laser/optical source distributing the optical power via the fiber optic assembly. Such a central source may receive its energy from electricity or directly from sunlight (e.g., solar pumped lasers). The laser beam received by PV 154 is converted to electrical energy by PV 154 and used to charge device 180.

The laser beam emitted by transmitter 110 is modulated by controller 112 to have a unique signature associated with scanner 114. In one embodiment, such a signature is defined by a frequency modulation technique used to modulate the transmitted laser beam. After the laser beam arrives at the PV cell, a corresponding frequency demodulation technique is used on the output current of the PV cell(s) to identify the signal and determine whether it has the expected signature. In another embodiment, such a signature is defined by an amplitude modulation technique used to modulate the amplitude of the transmitted laser beam. In yet other embodiments, the beam may be encrypted or altered to include a unique signature.

Controller 152 is adapted to use a corresponding demodulation technique on the output current of the PV cell(s) to identify the signal and determine whether it has the signature with which the signal was modulated—referred to herein as the expected signature at the receiver. In one embodiment, as long as the laser power received by receiver 150 is detected as matching the power of the laser beam transmitted by transmitter 110, and is identified to have the expected signature, controller 152 continues to transmit a clear-to-send signal via transceiver 152 to transmitter 110. In response to receiving the clear-to-send signal, controller 112 causes scanner 114 to transmit the laser beam to receiver 150.

The power of laser beam 125 stays low to and in an eye-safe power level, or is otherwise reduced to zero as described further below, as long as the laser beam is not targeted on the PV cell(s), or is not identified by the PV cells as having the expected signature, or if the path between the transmitter and receiver is not detected as being clear, thereby causing a reduction of the laser power at the receiver. As long as these conditions are met, the receiver sends a clear-to-send signal to the transmitter. Once the clear-to-send signal is received from the receiver, the transmitter increases the laser power for wireless power delivery. If any of these conditions are not met, the clear-to-send signal is aborted thus causing controller 112 to shut off the laser or reduce the laser power to an eye-safe power level.

If an object stands in the path of and blocks the laser beam from directly reaching PV cell 154, the power level of the laser beam transmitted by scanner 114 and possibly reflected/scattered off objects and subsequently received by PV cell 154 is detected to be less than the power level of the transmitted beam. Accordingly, even though such a reflected/scattered beam is identified by controller 152 as having the expected signature, because its power level is detected as being less than that of the transmitted beam, transmitter 110 stops transmitting the clear-to-send signal, thus causing controller 112 to stop transmitting the laser beam via scanner 114. Accordingly, any mechanical/physical movement that blocks the path of the laser beam from the scanner 114 to PV cell 154 is detected quickly (e.g., within a few micro seconds) thus causing the transmission of the laser beam to end. In other words, because the presence of, e.g., a person or a pet moving in the path of the laser beam is quickly detected, any possible damage to the skin or cornea that would otherwise result from the beam is substantially mitigated and thus prevented.

A laser beam received by PV cell 154 and detected by controller 152 as having the power level but not the signature of the transmitted beam, causes controller 152 to stop transmitting the clear-to-send signal, thereby causing transmitter 110 to stop transmitting the laser beam. Accordingly, the transfer of the laser power continues to occur at a high level as long as both the power and the signature of the transmitted beam matches the power and signature of the beam as expected at the receiver.

Assuming a maximum shut-down delay of to and a corresponding MPE of $W_0$, the maximum allowable continuous power of the laser satisfying the safety regulation requirement may be defined as following:

$$P_{laser,max} = \frac{W_0}{t_0'}$$

Figure 1:
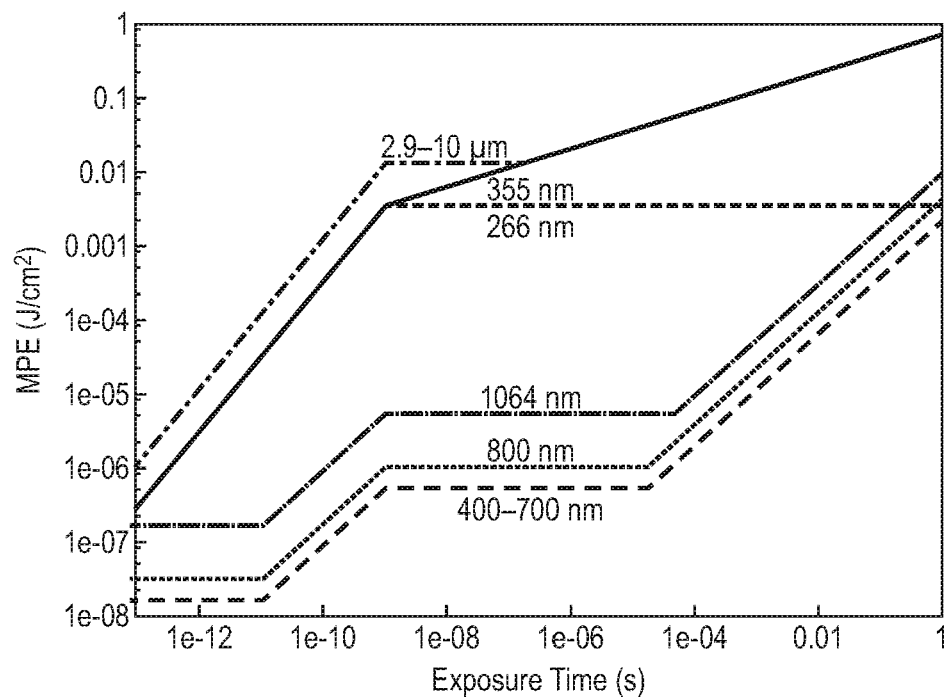
FIG. 1 is a plot of MPE for different wavelengths at different exposure times, as known in the prior art.

For example, for a laser with wavelength of 800 nm and beam width of 1 cm², if to is 100 μsec, from FIG. 1, it is seen that $W_0 = 3\ e^{-6}$ J/cm2, corresponding to a laser power of P=30 mW. If to is reduced to 1 μsec, then the laser power may be as high as 1 W. The maximum allowable laser power satisfying the safety regulation calculated above is for one beam of laser. By aggregating the power from multiple beams higher transmitted wireless power levels can be achieved without violating the safety regulations.

Figure 3:
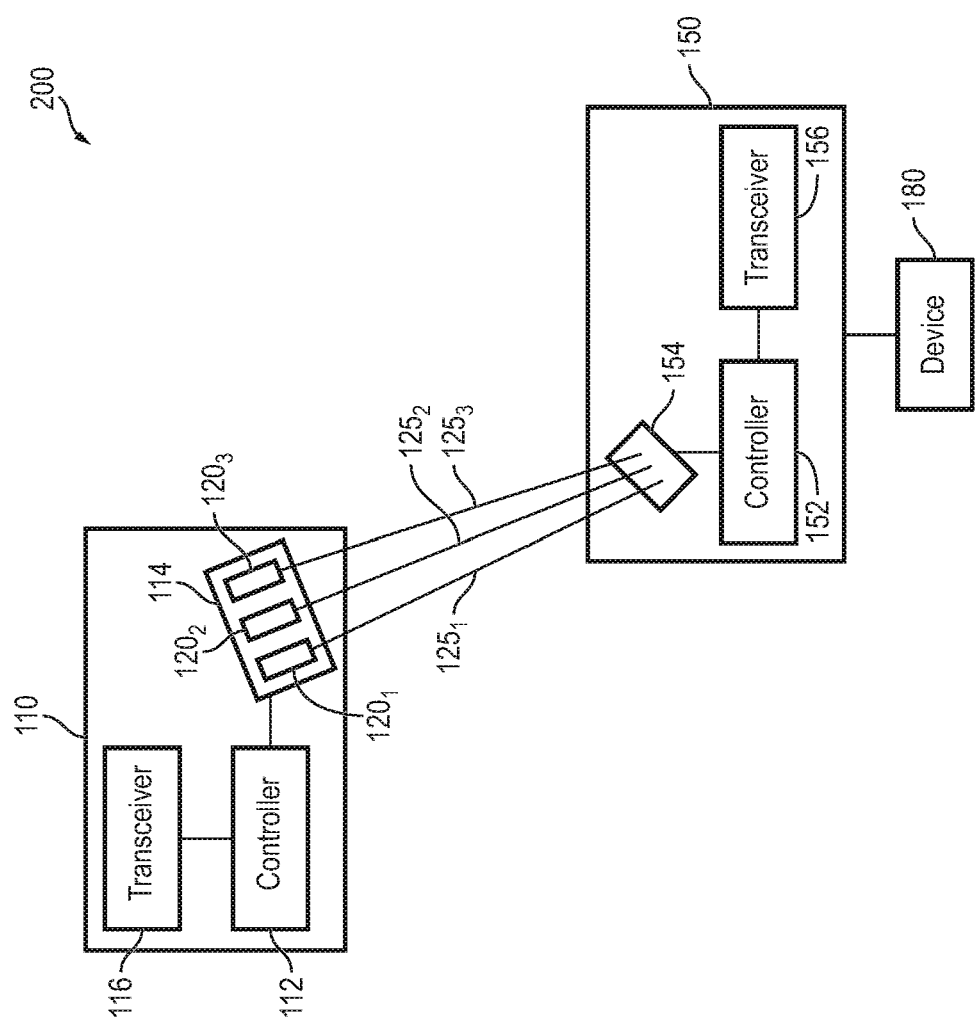
FIG. 3 is a simplified high-level block diagram of a wireless laser power transfer system, in accordance with another exemplary embodiment of the present invention.

FIG. 3 is a simplified high-level block diagram of a wireless laser power transfer system 200 with active safety protection, in accordance with another exemplary embodiment of the present invention. System 200 is similar to system 100 except that system 200 is shows as including more laser sources than PV cells. The exemplary embodiment of FIG. 3 is shown as including, in part, 3 laser sources, namely $120_1$, $120_2$ and $120_3$, and 1 PV cell 154. Scanner 114 is adapted to control and scan the direction of the beams $125_1$, $125_2$, $125_3$ supplied respectively by sources $120_1$, $120_2$, $120_3$ so as to ensure that these beams strike PV cell 154 as long as transceiver 116 receives a clear-to-send signal from transceiver 156.

Each of laser sources $120_1$, $120_2$ and $120_3$ has a unique signature that controller 152 is adapted to identify. The signatures may be pre-programmed in controller 152 or be transmitted to controller 152 using the wireless link established between transmitter 110 and receiver 150 via their respective transceivers 116 and 156. The wireless link, which may be an RF link, an infrared link, or the like enables individual transmitter and receivers to be identified in a network of such devices.

Assume that the electrical signal generated by PV cell 154 has several different components representative of the laser beams it received. Controller 152 is adapted to perform, for example, a Fast Fourier transform on the output signal of PV cell 154 to identify the signature of such components. If the signatures so identified match the signatures of the beams, and the power level of the beams match their expected power levels, a clear-to-send signal is transmitted by receiver 150 to transmitter 110 to enable sources $120_1$, $120_2$, $120_3$ to continue to transmit. Assume, for example, that controller 152 is able to identify only the two signatures associated with beams $125_1$, $125_3$. Accordingly, the clear-to-send signal includes information directing transmitter 110 to continue to transmit from laser sources $120_1$, $120_3$ and shut off transmission from source $120_2$. As described above, if, for example, the signature of all three beams is present in the electrical signal received by PV cell 154 but the power level associated with any of the beams (e.g., beam $125_1$) falls below the beam's expected power level at receiver 150 (due, for example to partial or full obstruction of the beam), the clear-to-send signal includes information directing transmitter 110 to shut off the laser source whose power level at the receiver is detected to have fallen below the expected level or reduce its power to an eye-safe level (e.g., source $120_1$).

Figure 4:
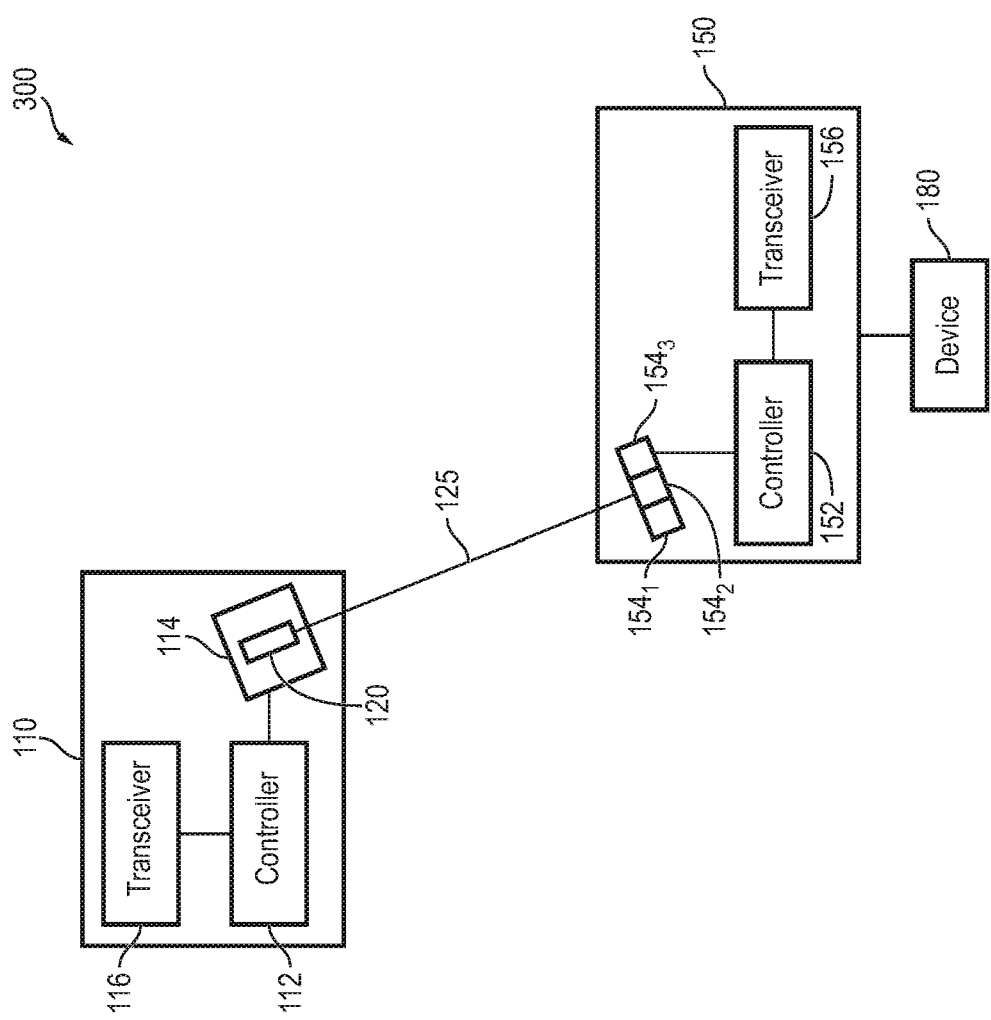
FIG. 4 is a simplified high-level block diagram of a wireless laser power transfer system, in accordance with another exemplary embodiment of the present invention.

FIG. 4 is a simplified high-level block diagram of a wireless laser power transfer system 300 with active safety protection, in accordance with another exemplary embodiment of the present invention. System 300 is similar to system 100 except that system 400 is shows as including more PV cells than laser sources. The exemplary embodiment of FIG. 3 is shown as including, in part, three PV cells $154_1$, $154_2$ and $154_3$, and one laser source 120. Scanner 114 is adapted to control and scan the direction of the beams 125 supplied by laser source 120 so as to ensure that beam 125 strikes at least one of the PV cell $154_1$, $154_2$ in an unobstructed manner.

Laser source 120 has a unique signature that controller 152 is adapted to identify. The signature may be pre-programmed in controller 152 or be transmitted to controller 152 via the wireless link established between transmitter 110 and receiver 150 through their respective transceivers 116 and 156.

Assume that after calibration and scanning, receiver 150 issues a clear-to-send signal to transmitter 110 thereby causing laser source 120 to strike, e.g., PV cell $154_2$. The emission of beam 125 on PV cell $154_2$ continues so long as both the power and the signature of beam 125 matches the power and signature of this beam as expected at the receiver. If an object blocks the path of beam 125, thereby causing the received laser power to no longer match the expected power at the receiver, the clear-to-send signal is aborted, thereby causing controller 112 to shut off or reduce the power of laser source 120 to an eye-safe level. In some embodiments, if the duration of such shut-off period extents a pre-defined threshold value, controller 112 causes scanner 114 to change the direction of beam 125 so as to cause beam 125 to strike another PV cell, such as PV cell $154_1$. In other words, in accordance with such embodiments, if the path of the laser beam to one or more of the PV cells is detected to have been blocked, the laser source may continue to charge device 180 via another unobstructed PV cell.

Figure 5:
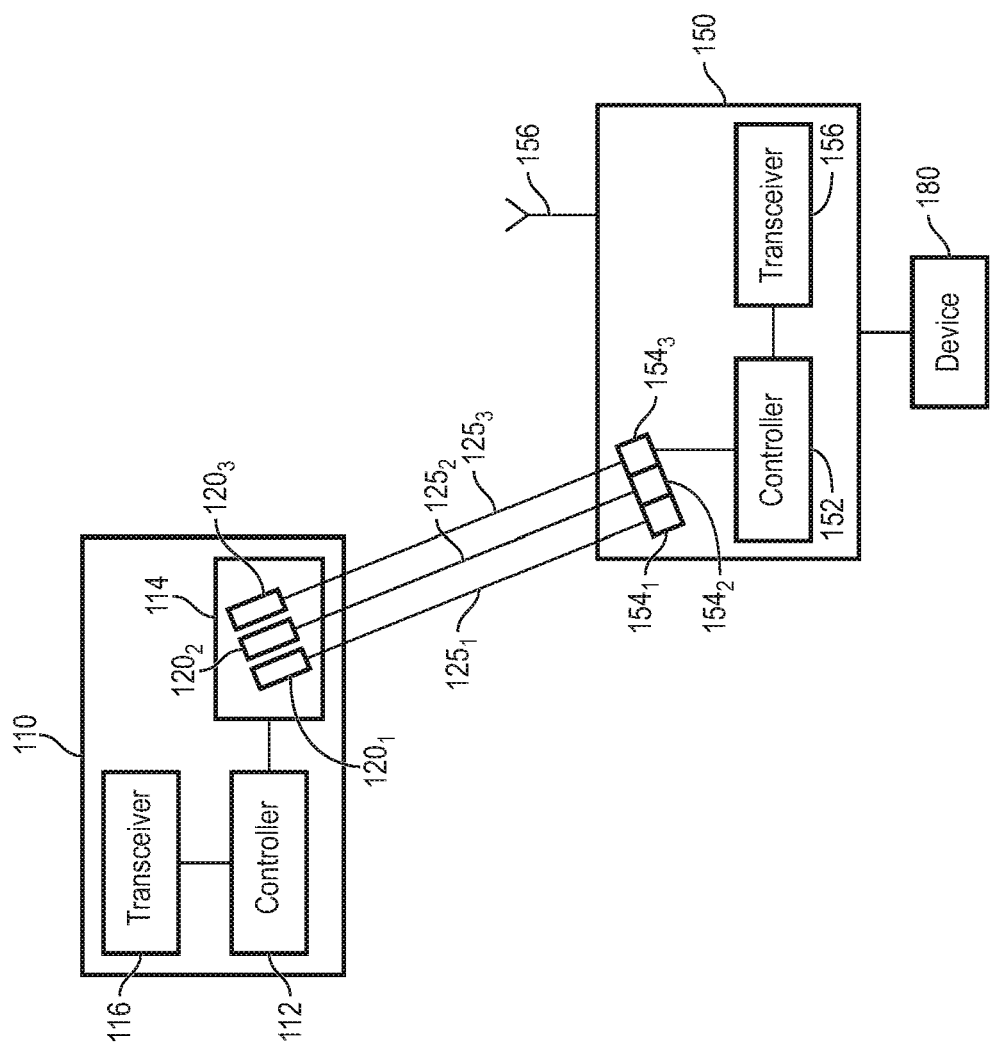
FIG. 5 is a simplified high-level block diagram of a wireless laser power transfer system, in accordance with another exemplary embodiment of the present invention.

FIG. 5 is a simplified high-level block diagram of a wireless laser power transfer system 400 with active safety protection, in accordance with another exemplary embodiment of the present invention. System 400 is similar to system 100 except that system 400 is shown as including a multitude of laser sources and a multitude of PV cells. The exemplary embodiment of FIG. 5 is shown as including, in part, three PV cells $154_1$, $154_2$, $154_3$, and three laser sources $120_1$, $120_2$, and $120_3$. It is understood, however, that a wireless laser power transfer system, in accordance with embodiments of the present invention, may have any number M of laser sources, and any number N of PV cells, where M and N are integers that may or may not be equal.

Scanner 114 is adapted to control the laser sources so that beams $125_1$, $125_2$ and $125_3$ emitted respectively by laser sources $120_1$, $120_2$ and $120_3$ strike PV cells $154_1$, $154_2$, and $154_3$ to avoid crossing of the beams. Controller 154 is adapted to identify and validate the signature associated with each beams $125_1$, $125_2$ and $125_3$. If all three beams are safely on, i.e., none has been shut off or has its power reduced to an eye-safe level for safety reasons in accordance with embodiments of the present invention, then beam $125_1$ is recognized as a valid beam when received at PV cell $154_1$, beam $125_2$ is recognized as a valid beam when received at PV cell $154_2$, and beam $125_3$ is recognized as a valid beam when received at PV cell $154_3$; accordingly, a clear-to-send signal transmitted by receiver 156 may include information specific to each of laser sources $120_1$, $120_2$ and $120_3$.

Assume, for example, that as a result of the movement of an object (e.g., a person), the path from source $125_2$ to PV cell $154_2$ is fully or partially blocked. Accordingly, controller 152 instructs controller 112 to no longer transmit beam $125_2$ to PV cell $154_2$. Upon receipt of such an instruction, controller 112 may shut off laser $120_2$ or alternatively lower the power of laser $120_2$ to an eye-safe level and thereafter cause scanner 114 to steer beam $125_2$ until beam $125_2$ strikes any of the other two adjacent PV cell $154_1$ or $154_3$. Controller 152 is thus configurable to recognize the signature of a beam (e.g., beam $125_2$) when received at another PV cell (e.g., $154_1$) when the optical path between the source of the beam (e.g., beam $125_2$) and the primary PV cell (e.g., $154_2$) assigned to that beam is fully or partially blocked. After validating the signature and power of beam $125_2$ at cell $154_2$, transmitter is instructed via the wireless link to raise the power of the beam $125_2$ to a higher value.

Similarly, assume, for example, that as a result of an object movement, the path from source $125_3$ to PV cell $154_3$ is fully or partially blocked. Accordingly, controller 152 instructs controller 112 to no longer transmit beam $125_3$ to PV cell $154_3$. Upon receipt of such an instruction, controller 112 may shut off laser $120_3$, or alternatively lower the power of laser $120_2$ to an eye-safe level, and thereafter cause scanner 114 to steer beam $125_3$ until beam $125_3$ strikes PV cell $154_2$. Controller 152 is thus configurable to recognize the signature of a beam (e.g., beam $125_3$) when received at another PV cell (e.g., $154_2$) when the optical path between the source of the beam (e.g., beam $125_3$) and the primary PV cell (e.g., $154_3$) assigned to that beam is fully or partially blocked. After validating the signature and power of beam $125_3$ at cell $154_2$, transmitter is instructed via the wireless link to raise the power of the beam $125_2$ to a higher value. Although the above embodiments of the present invention are described with reference to changing the power of the laser beam from an eye-safe level to a higher power level once the laser beam is validated, it is understood that in other embodiments, in place of using a variable-power laser source, two sources of laser may be used, one operating at an eye-safe level for signaling and validation at the receiver, as described above, and one for operating at a higher level for charging the device.

It is understood that, in accordance with the embodiments of the present invention, a laser beam may be redirected and identified as a valid beam at any PV cell so long as that beam does not intersect another beam as it is being redirected. For example, when the laser sources and the PV cells are laterally shifted in space so that either the laser sources, or the PV cells, or both are in different planes, the beams can be redirected to different PV cells with a much lower probability of intersecting one another as they are redirected.

Figure 6:
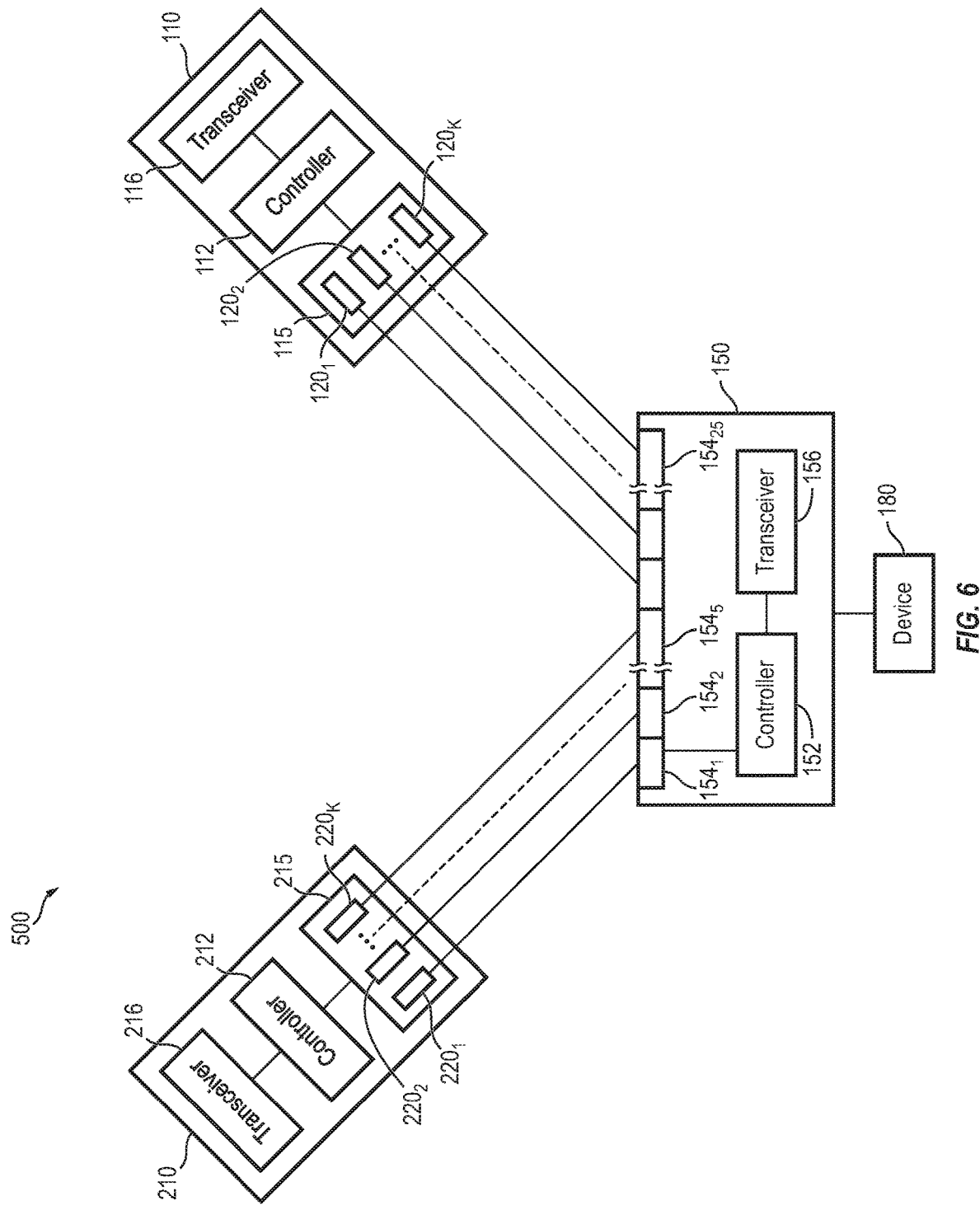
FIG. 6 is a simplified high-level block diagram of a wireless laser power transfer system, in accordance with another exemplary embodiment of the present invention

FIG. 6 is a simplified high-level block diagram of a wireless laser power transfer system 500 with active safety protection, in accordance with another exemplary embodiment of the present invention. System 500 is similar to the embodiments shown in FIGS. 2-5 except that system 500 is shown as including a multitude of transmitters having laser sources disposed on different panels positioned at different locations within a closed environment, such as a room, to charge a device 180. FIG. 6 shows two such transmitters 110 and 210 having laser sources disposed on panels 115 and 215, but it is understood that a wireless laser power transfer system, in accordance with embodiments of the present invention, may have any number of transmitters dispersed throughout a given space, with different transmitters having laser sources disposed on different panels having different locations and/or orientations with respect to the PV cells.

Each of transmitters 110 and 220 is shown as including, in part, k sources of lasers each generating a beam directed toward a PV cell. Transmitter 110 is shown as including laser sources $120_1$, $120_2$ ... $120_k$ adapted to generate laser beams $125_1$, $125_2$ ... $125_k$. Transmitter 210 is shown as including laser sources $220_1$, $220_2$ ... $220_k$ adapted to generate laser beams $225_1$, $225_2$ ... $225_k$. Although not shown, it is understood that the embodiments of the present invention are not so limited and that in other embodiments, different transmitters may have different number of laser sources. Each transmitter is also shown as including, in part, a controller, and a transceiver. For example, transmitter 110 is shown as including a controller 112 and a transceiver 116, and transmitter 210 is shown as including a controller 212 and a transceiver 216.

System 500 is also shown as including, in part, a receiver 150 having disposed therein a controller 152, a transceiver 156 and a multitude of PV cells $154_j$, wherein j is an integer. In the embodiment shown in FIG. 6, each laser beam is shown as striking a different one of the PV cells $154_j$. It is understood, however, that the embodiments of the present invention are not so limited and that in other embodiments, one or more of the laser beams may impinge on the same PV cell. As described with reference to other embodiments, each laser beam is modulated to have a unique signature. A laser source $120_s$ or $220_s$, where s is an integer ranging from 1 to k in this exemplary embodiment, is enabled to switch from an off or an eye-safe state to a relatively high power state, as long as controller 152 validates the signature of the laser beam it receives and determines that the path of the laser beam to the PV cell it is scanned to strike is unobstructed. Because in accordance with the embodiment shown in FIG. 6, the laser sources are positioned on different panels at different locations within, e.g., a room, if the path of the laser beam from one of the laser source panels is blocked, the charging may be switched to or continue from another one of the laser source panels. In some embodiments, controllers 112 and 212 are adapted to communicate and coordinate their actions via the wireless link established between their respective transceivers.

Although the above embodiments are shown as including a one-dimensional array of transmitters, it is understood, that in other embodiments, two or three dimensional arrays of transmitters disposed in various locations may be used so as to increase the direct line-of-sight and the power transmitted to the receiver. In one embodiment, to improve efficiency, an algorithm guides the scanning laser beams towards the receive, while ensuring that no more than a single laser beam illuminates the same PV cell in the array of PV cells disposed in the receiver. Such an algorithm further ensures that the laser beams do not interest each other in space before arriving at the receiver.

In accordance with one aspect of the present invention, to further increase safety and efficiency, the PV cells are coated with an anti-reflection coating. Such anti-reflection coating boosts the efficiency of the PV cell while minimizing the possibility of undesirable reflections from the PV cell.

In accordance with yet another aspect of the present invention, the surface of each PV cell is patterned. Such patterning may be random or specifically designed to prevent reflections at a particular laser wavelength. Random patterns prevent direct mirror like reflections and produce a diffused reflection from the surface that minimize the harmful effect of the laser beam on the human eye. In accordance with yet another aspect of the present invention, the PV cells are formed using Gallium Nitride having bandgaps that accommodate laser wavelengths in the range of 250 nm to 450 nm.

Figure 7:
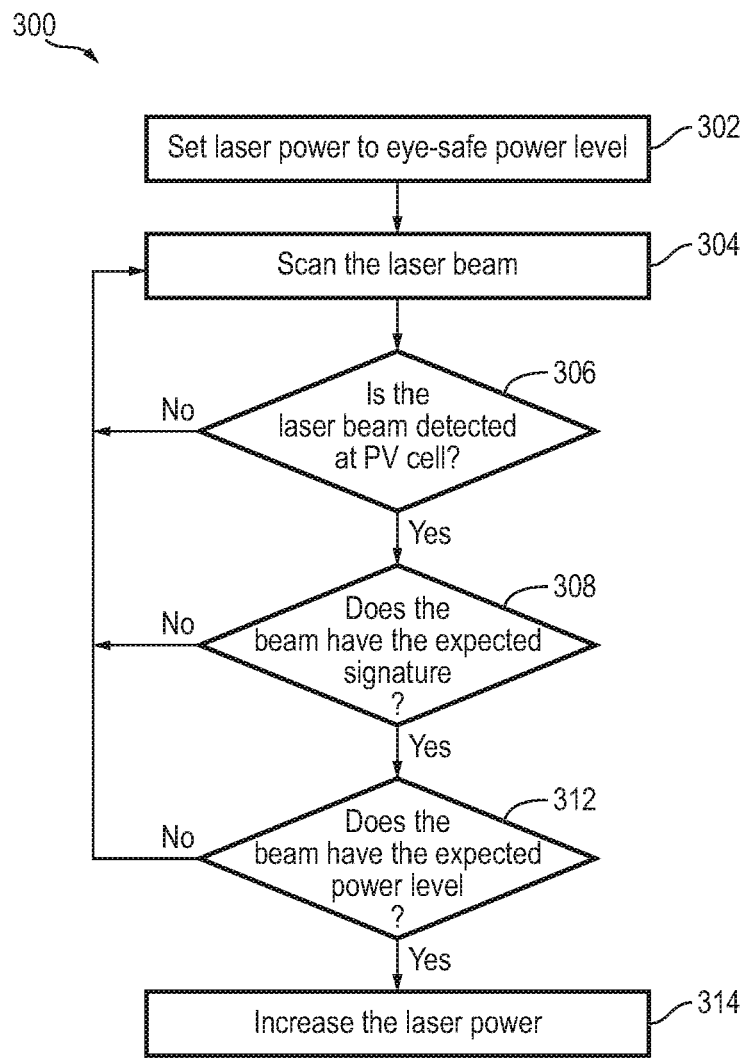
FIG. 7 is a flowchart for safe transfer of laser power wirelessly, in accordance with one embodiment of the present invention.

FIG. 7 is a flowchart of a process 300 for transmitting laser power wirelessly, in accordance with one embodiment of the present invention. The laser power is set to an eye-safe level initially at 302 and scanned. The scanning continues at 304 until the laser beam is detected at 306 by a PV cell. If the beam is detected as not having the expected signature at 308, the process moves to 304 at which point the scanning of laser beam is repeated. If the laser beam is detected as having the expected signature at 308, and is further determined to have the expected power level at 312, the laser power is caused to increase to a higher value at 314. If the laser beam is detected as not having the expected power level at 312, the process moves to 304 at which point the scanning of the laser beam is repeated.

Figure 8:
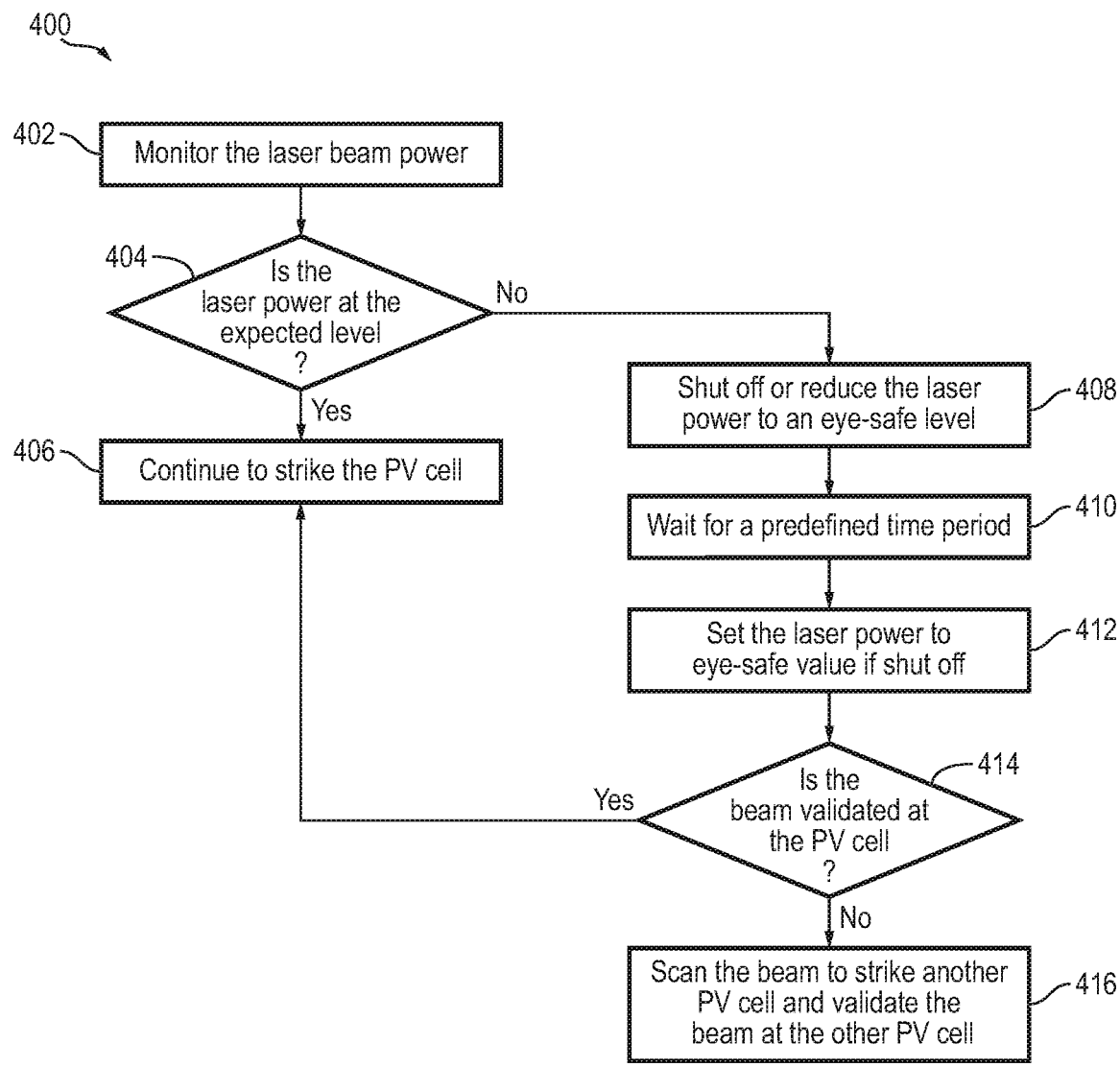
FIG. 8 is a flowchart for safe transfer of laser power wirelessly, in accordance with one embodiment of the present invention.

FIG. 8 is a flowchart of a process 400 for controlling a laser source that has been previously detected by a first PV cell as having the expected power level and signature (validated) and is thus operating at a relatively high level to charge a device, in accordance with one embodiment of the present invention. At 402, the laser beam power is continued to be monitored. If at 404 it is determined by the receiver that the laser power is at or near the expected power level, the laser beam is caused to continue to impinge of the PV cell. If at 404 it is determined by the receiver that the laser power is below the expected level (e.g., due to obstruction of the laser beam path), the laser beam is shut off or reduced to an eye-safe level at 408. The laser power is maintained at the off or eye-safe level for a predefined time period at 410. Then to determine if the obstruction was caused by a moving object that is no longer obstructing the beam path, at 412, the laser beam is set to an eye-safe level if it was previously shut off at 408 and caused to strike the first PV cell again. If at 414 the first PV cell can validate the beam again, the beam is caused to continue to strike the first PV cell at 406. If, however, at 414 the first PV cell is unable to validate the beam (the path to the first PV cell remains obstructed), the beam is caused to scan at 416 for another PV cell that may be available and can validate the beam.

The above embodiments of the present invention are illustrative and not limitative. The embodiments of the present invention are not limited by the number of laser sources in each transmitter or the number of transmitters. The above embodiments of the present invention are not limited by the number of photo-voltaic cells. The above embodiments of the present invention are not limited by the modulation schemes used to modulate the laser beams. The above embodiments of the present invention are not limited by the wavelength of the laser sources. Other modifications and variations will be apparent to those skilled in the art and are intended to fall within the scope of the appended claims.

What is claimed is:

1. A wireless laser power transfer system comprising:
   a first source of laser beam;
   a first controller adapted to vary a power and a direction of the first laser beam, said first controller further adapted to modulate the first laser beam; and
   a first wireless communication system adapted to receive a radio frequency signal or an infrared signal from a first target receiving the laser beam to coordinate the laser beam delivery to the first target;
   a second source of laser beam; and
   a second controller adapted to vary a power and a direction of the second laser beam, and wherein said second controller is further adapted to modulate the second laser beam, wherein said first controller causes the first modulated laser beam to strike a first target during a first time interval and the second controller causes the second modulated laser beam to strike a second target during the first time interval, and wherein said first controller causes the first modulated laser beam to strike the second target during a second time interval, and the second controller causes the second modulated laser beam to strike the first target during the second time interval.

2. The system of claim 1 wherein the first controller tracks movement of the first target.

3. The system of claim 2 wherein the second controller tracks movement of the second target.

4. The system of claim 1 wherein the first controller is further adapted to cause the first laser source to operate at a first power level if the first wireless communication system receives a signal from the first target indicating that the power of the first laser beam as received at the first target matches an expected power level.

5. The system of claim 4 wherein said first controller is further adapted to cause the first laser source to operate at a second power level if the signal received from the first target indicates that the power of the laser beam as received at the first target does not match the expected power level, said second power-level being either zero or an eye-safe power level.

6. The system of claim 1 wherein the first laser source is disposed on a first panel and said second laser source is disposed on a second panel different from the first panel.

7. A wireless laser power transfer system comprising:
   a first source of laser beam;
   a first controller adapted to vary a power and a direction of the first laser beam, the first controller further adapted to modulate the first laser beam and cause the first modulated laser beam to strike a first target;
   a first wireless communication system adapted to receive a radio frequency signal or an infrared signal from the first target receiving the laser beam to coordinate the laser beam delivery to the first target;
   a second source of laser beam; and
   a second controller adapted to vary a power and a direction of the second laser beam, wherein said second controller is further adapted to modulate the second laser beam, wherein said second controller causes the second laser beam to strike the first target.

8. The system of claim 7 wherein the second controller tracks movement of the first target.

9. The system of claim 7 wherein the first laser source is disposed on a first panel and said second laser source is disposed on a second panel different from the first panel.

10. The system of claim 7 wherein the first and second laser sources have eye-safe power levels.

11. A method of transferring laser power wirelessly comprising:
   varying a power and a direction of a first laser beam;
   modulating the first laser beam;
   delivering the first modulated laser beam to a first target; and receiving a radio frequency signal or an infrared signal from the first target to coordinate the delivery of the laser beam to the first target;

delivering the first modulated laser beam to the first target during a first time interval;

modulating a second laser beam;

delivering the second modulated laser beam to a second target during the first time interval;

delivering the first modulated laser beam to the second target during a second time interval; and delivering the second modulated laser beam to the first target during the second time interval.

12. The method of claim 11 further comprising:
tracking movement of the first target.

13. The method of claim 12 further comprising:
tracking movement of the second target.

14. The method of claim 11 further comprising:
operating the first laser beam at a first power level if a signal received from the first target indicates that the power of the first laser beam as received at the first target matches an expected power level.

15. The method of claim 14 further comprising:
operating the first laser beam at either zero or an eye-safe power level if the signal indicates that the power of the first laser beam as received at the first target fails to match an expected power level.

16. The method of claim 11 further comprising:
varying a power of the second laser beam.

17. The method of claim 11 further comprising:
disposing a first laser source generating the first laser beam on a first panel; and
disposing a second laser source generating the second laser beam on a second panel different from the first panel.

18. A method of transferring laser power wirelessly:
varying a power and a direction of a first laser beam;
modulating the first laser beam;
delivering the first modulated laser beam to a first target;
receiving a radio frequency signal or an infrared signal from the first target to coordinate the delivery of the first laser beam to the first target;
varying a power and a direction of a second laser beam;
modulating the second laser beam; and
delivering the second modulated laser beam to the first target.

19. The method of claim 18 further comprising:
tracking movement of the first target.

20. The method of claim 19 further comprising:
tracking movement of the second target.

21. The method of claim 18 further comprising:
operating the first laser beam at a first power level if a signal received from the first target indicates that the power of the first laser beam as received at the first target matches an expected power level.

22. The method of claim 21 further comprising:
operating the first laser beam at either zero or an eye-safe power level if the signal indicates that the power of the first laser beam as received at the first target fails to match an expected power level.

23. The method of claim 18 further comprising:
delivering at least one of the first and second modulated laser beams to a second target.

24. The method of claim 18 further comprising:
disposing a first laser source generating the first laser beam on a first panel; and
disposing a second laser source generating the second laser beam on a second panel different from the first panel.

* * * * *